(12) United States Patent (10) Patent No.: US 8,804,840 B2
Hasui (45) Date of Patent: Aug. 12, 2014

(54) IMAGE PROCESSING APPARATUS, IMAGE PROCESSING METHOD AND PROGRAM

(75) Inventor: Shigeki Hasui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 137 days.

(21) Appl. No.: 13/258,377

(22) PCT Filed: May 19, 2011

(86) PCT No.: PCT/JP2011/062038
§ 371 (c)(1),
(2), (4) Date: Sep. 21, 2011

(87) PCT Pub. No.: WO2011/148998
PCT Pub. Date: Dec. 1, 2011

(65) Prior Publication Data
US 2012/0170664 A1 Jul. 5, 2012

(30) Foreign Application Priority Data
May 27, 2010 (JP) ................. 2010-122029

(51) Int. Cl.
*H04N 11/02* (2006.01)
*H04N 1/64* (2006.01)
*H04N 1/41* (2006.01)
*H04N 1/32* (2006.01)
*H04N 7/50* (2006.01)
*G06F 3/12* (2006.01)
*G06T 3/40* (2006.01)
*G09G 5/14* (2006.01)

(52) U.S. Cl.
CPC ............. *H04N 1/642* (2013.01); *H04N 1/41* (2013.01); *H04N 1/32561* (2013.01); *H04N 7/50* (2013.01); *G06F 3/122* (2013.01); *G06T 3/403* (2013.01); *G09G 2340/02* (2013.01); *G09G 5/14* (2013.01)
USPC ............ 375/240.24; 375/240.01; 375/240.23; 375/240.25; 375/240.26; 375/240.27; 375/240.28; 375/240.29

(58) Field of Classification Search
CPC .......... H04N 1/32561; H04N 1/32587; H04N 19/00078; H04N 7/50; H04N 7/26244; H04N 7/26313; H04N 7/2671; H04N 7/26015; G06F 3/122; G09G 2340/02
USPC .................................................... 375/240.24
See application file for complete search history.

(56) References Cited

U.S. PATENT DOCUMENTS 4,630,125 A * 12/1986 Roetling ...................... 358/3.08
5,021,891 A * 6/1991 Lee .............................. 382/250
(Continued)

FOREIGN PATENT DOCUMENTS

JP 9-261632 10/1997
JP 2004-023316 1/2004
(Continued)

*Primary Examiner* — Andy Rao
*Assistant Examiner* — Shan Elahi
(74) *Attorney, Agent, or Firm* — Fitzpatrick, Cella, Harper & Scinto

(57) ABSTRACT

An image processing apparatus according to the present invention includes an encoding means for encoding image data on a tile-by-tile basis, each tile being constituted by a plurality of blocks, and each block having a predetermined size, and a storing means for determining whether or not each tile includes a row or column of pixels designated to be deleted in the image data, and if the tile includes a row or column of pixels designated to be deleted, storing deletion information that indicates a corresponding row or column of pixels designated to be deleted in the tile, in header information of the tile that has been encoded.

5 Claims, 12 Drawing Sheets

(56) References Cited

U.S. PATENT DOCUMENTS

| | | | | |
|---|---|---|---|---|
| 5,471,248 | A * | 11/1995 | Bhargava et al. | 375/240.24 |
| 6,067,117 | A | 5/2000 | Yamauchi | 348/390 |
| 6,157,389 | A * | 12/2000 | Knowlton | 345/660 |
| 6,529,634 | B1 * | 3/2003 | Thyagarajan et al. | 382/239 |
| 6,754,279 | B2 * | 6/2004 | Zhou et al. | 375/240.28 |
| 6,956,974 | B1 * | 10/2005 | Ito et al. | 382/240 |
| 7,356,198 | B2 * | 4/2008 | Chauville et al. | 382/275 |
| 8,023,749 | B2 * | 9/2011 | Nakayama | 382/232 |
| 2001/0045988 | A1 * | 11/2001 | Yamauchi et al. | 348/273 |
| 2002/0003578 | A1 * | 1/2002 | Koshiba et al. | 348/273 |
| 2002/0012054 | A1 * | 1/2002 | Osamato | 348/273 |
| 2002/0012055 | A1 * | 1/2002 | Koshiba et al. | 348/273 |
| 2002/0012398 | A1 * | 1/2002 | Zhou et al. | 375/240.25 |
| 2002/0015447 | A1 * | 2/2002 | Zhou | 375/240.25 |
| 2002/0027604 | A1 * | 3/2002 | Hung | 348/239 |
| 2002/0135683 | A1 * | 9/2002 | Tamama et al. | 348/222 |
| 2003/0202707 | A1 * | 10/2003 | Thyagarajan et al. | 382/239 |
| 2003/0222998 | A1 * | 12/2003 | Yamauchi et al. | 348/262 |
| 2004/0126029 | A1 * | 7/2004 | Sakuyama et al. | 382/240 |
| 2005/0286777 | A1 * | 12/2005 | Kumar et al. | 382/232 |
| 2007/0147502 | A1 * | 6/2007 | Nakamura | 375/240.12 |
| 2007/0292036 | A1 * | 12/2007 | Nakayama | 382/232 |
| 2011/0157608 | A1 | 6/2011 | Hasui | 358/1.2 |
| 2011/0188750 | A1 | 8/2011 | Tamura | 382/167 |
| 2011/0243429 | A1 * | 10/2011 | Yao | 382/162 |
| 2012/0219055 | A1 * | 8/2012 | He et al. | 375/240.03 |

FOREIGN PATENT DOCUMENTS

| | | |
|---|---|---|
| JP | 2007-243889 | 9/2007 |
| JP | 2011-071767 | 4/2011 |
| WO | 2011/037009 | 3/2011 |

* cited by examiner

FIG. 4

| BLOCK (PATTERN INFORMATION) | NUMBER OF BLOCK COLORS (COMBINATIONS) | PATTERN INFORMATION | LOW-RESOLUTION IMAGE DATA | INTERPOLATION DATA | | |
|---|---|---|---|---|---|---|
| | | | 1st color | 2nd color | 3rd color | 4th color |
| ▦ 502 (0x0) | SINGLE COLOR = ALL PIXELS OF THE SAME COLOR (ONE COMBINATION) | Pattern [4bit] | data 24[bit] | | | |
| (0x1) (0x2) (0x3) (0x4) (0x5) (0x6) (0x7) | TWO COLORS (SEVEN COMBINATIONS) | Pattern [4bit] | data 24[bit] | data 24[bit] | | |
| (0x8) (0x9) (0xA) (0xB) (0xC) (0xD) | THREE COLORS (SIX COMBINATIONS) | Pattern [4bit] | data 24[bit] | data 24[bit] | data 24[bit] | |
| (0xE) | ALL PIXELS OF DIFFERENT COLORS (ONE COMBINATION) | Pattern [4bit] | data 24[bit] | data 24[bit] | data 24[bit] | data 24[bit] |

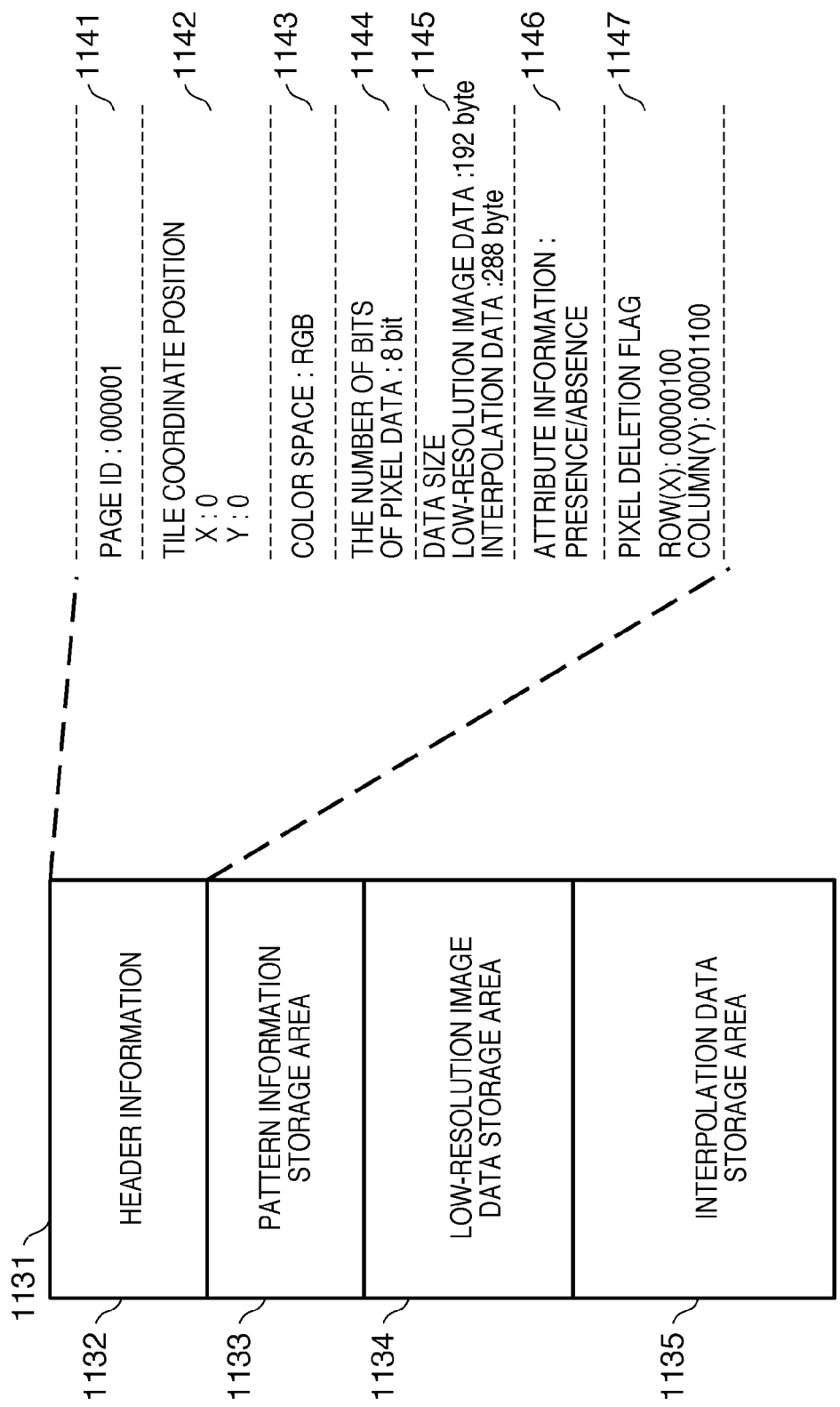

IMAGE PROCESSING APPARATUS, IMAGE PROCESSING METHOD AND PROGRAM

TECHNICAL FIELD

The present invention relates to an image processing apparatus for encoding image data on a block-by-block basis, each block having a predetermined size, an image processing method, and a program.

BACKGROUND ART

The size of image data handled by image processing apparatuses such as digital multifunction peripherals is increasing with demands for colorization and higher resolution. For this reason, with image processing apparatuses, image data is handled internally in encoded form in order to save the capacity of memory or hard disk at the time of spooling image data or to shorten the access time. Handling encoded image data also reduces a bandwidth load on the internal bus and improves the efficiency of data processing performed in the system.

Examples of systems for encoding color still images include the JPEG system using discrete cosine transform and systems using Wavelet transform. These encoding systems realize high encoding efficiency by encoding an image in predetermined block units (for example, 8×8 pixels or 16×16 pixels) and performing discrete cosine transform, quantization, and entropy encoding on the encoded image. These encoding systems are variable-length encoding systems in which the amount of encoding varies for each image to be encoded. These systems are also lossy encoding systems in which pre-encoding data does not completely match data obtained by encoding and decoding.

Examples of techniques for encoding a feature quantity of an image, instead of encoding pixels themselves, include known encoding systems such as the run-length encoding system for storing pixel data and the number of contiguous pixel data pieces, and the JBIG system in which differential encoding is repeatedly performed on encoded data of a low-resolution image. These encoding systems are lossless encoding systems in which pre-encoding data completely matches data obtained by encoding and decoding.

Incidentally, in order to perform predetermined image processing (such as deleting pixels) on image data encoded by an image processing apparatus, it is necessary to decode the image data and acquire original image data that is not encoded before performing the image processing. For example, in the aforementioned JPEG system, original image data is obtained by decoding image data that has been encoded by discrete cosine transform, by inverse discrete cosine transform, and image processing is performed on the obtained original image data. Then, after the image processing ends, the processed data is spooled after being encoded again as necessary. In the case of performing image processing multiple times, a sequence of decoding, image processing, and encoding is repeatedly performed a required number of times.

An example will be explained below, wherein image processing such as pixel deletion is required. In this example, an image with 100 (width)×120 (height) pixels is encoded in units of 8×8 pixels (hereafter referred to tiles). In addition, this image is encoded from the leftmost region. Then, 8×12=96 columns from the leftmost position will be encoded in tiles, and 4 columns at the rightmost position will remain. In this case, four columns of white pixels can be added to the remaining pixels to generate the columns of 8×8 tiles, and thus the given image will be encoded using the generated tiles.

In some instances, it is necessary to arrange encoded images side by side (i.e., in an image combination process). However, when images encoded as described above are simply arranged side by side, added white pixels will remain between the two images, and it is therefore desirable to delete such white pixels. Usually, such a deletion process will require decoding of the encoded images, deletion of the white pixels, and further re-encoding of the image after deletion. Such image combination processing is required when two images are arranged side by side and are printed out (e.g., for 2-in-1 printing, or aggregate printing). Such an image combination processing is also required when a repeated image printing function is required (e.g., a function of printing a scanned business card so that it is repeatedly placed without gaps on a predetermined size of a paper).

In the case of using a lossy encoding system as disclosed in Japanese Patent Laid-open No. 9-261632, processing resources are necessary in order to locally perform decoding processing, and, although locally, image quality is degraded because of performing encoding and decoding processing. Meanwhile, in the case of using a lossless encoding system such as the run-length encoding system, image quality degradation due to repeated execution of encoding and decoding in order to perform image processing multiple times does not occur, but decoding processing needs to be performed at least once in order to perform image processing, and therefore processing resources are necessary for that processing. Furthermore, in order to improve the performance of image processing, not only an image processing unit but also both encoding and decoding processing units need to offer performance equivalent to that required for image processing. For example, in the case of using a complicated encoding system such as the JBIG system, the circuit scale will increase because of required multiplexing or parallelization of processing circuits.

SUMMARY OF INVENTION

The present invention has been devised in view of the aforementioned problems, and the present invention provides an image processing apparatus, an image processing method, and a program that enable a pixel row or column targeted for deletion to be designated without decoding encoded image data.

According to one aspect of the present invention, an image processing apparatus comprises: an encoding means for encoding image data on a tile-by-tile basis, each tile being constituted by a plurality of blocks, and each block having a predetermined size; and a storing means for determining, for each tile, whether or not the tile includes a pixel row or column designated to be deleted in the image data, and if the tile includes a pixel row or column designated to be deleted, storing deletion information that indicates a corresponding pixel row or column designated to be deleted in the tile, in header information of the tile that has been encoded.

According to another aspect of the invention, an image processing method using a computer comprises: an encoding step, performed by an encoding means of the computer, of encoding image data on a tile-by-tile basis, each tile being constituted by a plurality of blocks, and each block having a predetermined size; and a storing step, performed by a storing means of the computer, of determining, for each tile, whether or not the tile includes a pixel row or column designated to be deleted in the image data, and if the tile includes a pixel row or column designated to be deleted, storing deletion information that indicates a corresponding pixel row or column designated to be deleted in the tile, in header information of the tile that has been encoded.

According to still another aspect of the invention, a program is provided for causing a computer to function as: an encoding means for encoding image data on a tile-by-tile basis, each tile being constituted by a plurality of blocks, and each block having a predetermined size; and a storing means for determining, for each tile, whether or not the tile includes a pixel row or column designated to be deleted in the image data, and if the tile includes a pixel row or column designated to be deleted, storing deletion information that indicates a corresponding pixel row or column designated to be deleted in the tile, in header information of the tile that has been encoded.

The present invention makes it possible to provide an image processing apparatus, an image processing method, and a program that enable a pixel row or column targeted for deletion to be designated without decoding encoded image data.

Further features of the present invention will become apparent from the following description of exemplary embodiments with reference to the attached drawings.

BRIEF DESCRIPTION OF DRAWINGS

FIG. 4 is a diagram showing the relationship of a block, the number of block colors, low-resolution image data, and interpolation data.

FIG. 11 is a diagram showing the data structure of a tile.

DESCRIPTION OF EMBODIMENTS

The applicant proposes the following resolution encoding processing in Japanese Patent Application No. 2009-221444 (published at Japanese Patent Laid-open No. 2011-071767, English counterpart at U.S. Published Application No. 2011/0188750). According to this technique, image data is first divided into blocks (for example, a block having a size of 2×2 pixels) and color data of each pixel in a block of interest is compared, in order to output arrangement pattern information regarding the arrangement pattern of color data pieces included in the block and color data information of each color included in the block. The output color data information is divided into color data information of a first color that corresponds to the color of a pixel at a predetermined position in the block (for example, color data information of the upper-left pixel in a 2×2 pixel block), and color data information of the other color(s) (color data information of second to fourth colors), which are then stored in memory regions. In other words, the feature of this technique is that the arrangement pattern information, the first color data information, and the other color data information obtained for each block are collectively stored in different memory regions. Since it is often the case that each block includes the same color of pixels, compressed data having a smaller data size than its original image data is stored in the memory regions. Furthermore, since the first color data information is the pixel value of a pixel located at a predetermined position in each block, the first color data information stored in contiguous memory regions is equivalent to a low-resolution image generated by simply performing thinning processing on an original image. Accordingly, low-resolution image data can be easily acquired. Furthermore, storing the low-resolution image data constituted by the first color data information of each block in contiguous memory regions makes it easy to perform processing directly on encoded data and enables pixels in the low-resolution image to be processed without decoding.

Hereinafter, embodiments of the present invention will be described in detail with reference to the drawings. Note that the following embodiments are not intended to limit the scope of the present invention, and not all combinations of the features described in the embodiments are essential for solving the problem of the present invention.

First Embodiment

Figure 1:
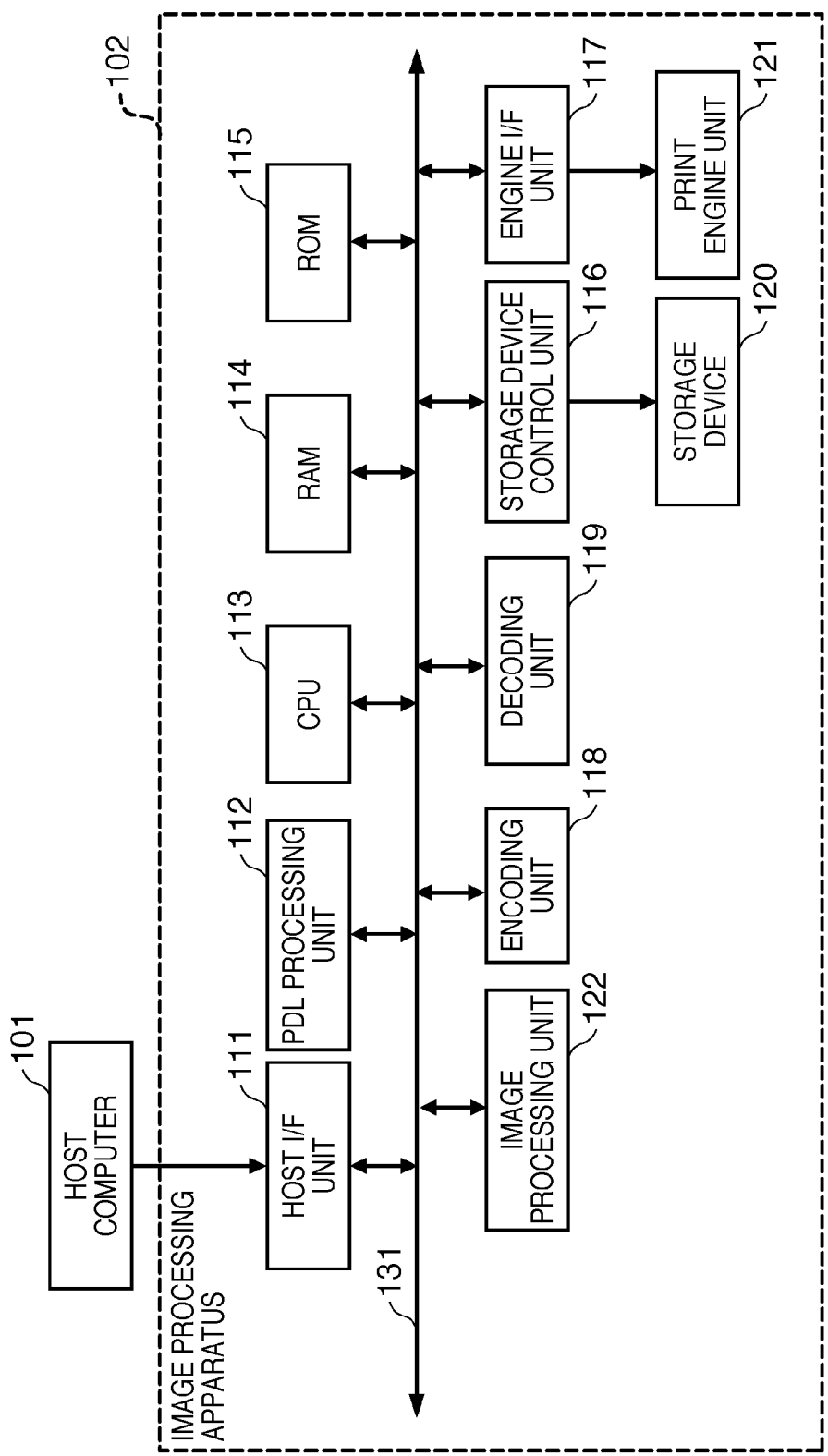
FIG. 1 is a diagram showing the overall configuration of an image processing system according to an embodiment of the invention.

Overall Configuration of Image Processing System (FIG. 1)

An image processing system according to the present embodiment includes a host computer 101 and an image processing apparatus 102.

The host computer 101 may be a general computer such as a personal computer (PC) or a work station (WS), and an image or a document created on such a computer is input to the image processing apparatus 102 as PDL data.

The image processing apparatus 102 receives data that is output from the host computer 101. This indicates that a network for enabling data communication is provided between the image processing apparatus 102 and the host computer 101, but there is no particular limitation on the configuration of such a network.

The image processing apparatus 102 performs various types of image processing based on the data received from the host computer 101, and outputs image-processed data to a print engine unit 121. The print engine unit 121 performs print processing on a storage medium, such as paper, based on the image-processed data output from the image processing apparatus 102. Note that although data is input from the host computer 101 to the image processing apparatus 102 in the present embodiment, data may be input from other devices, and, for example, a configuration is possible in which data output from a scanner input unit (not shown) is input to the image processing apparatus 102.

The image processing apparatus 102 includes a controller unit (not shown). The controller unit includes a host interface (I/F) unit 111, a PDL processing unit 112, a CPU 113, a RAM 114, a ROM 115, a storage device control unit 116, an engine I/F unit 117, an encoding unit 118, a decoding unit 119, a storage device 120, the print engine unit 121, and an image processing unit 122.

The host I/F unit 111 functions as an interface for receiving PDL data output from the host computer 101. Note that the host I/F unit 111 varies depending on the network for connecting the image processing apparatus 102 and the host computer 101, and is constituted by, for example, Ethernet (registered trademark) or a serial interface.

The PDL processing unit 112 performs processing for expanding PDL data received by the host I/F unit 111. The CPU 113 performs overall control of the image processing apparatus 102 using programs or data stored in the RAM 114 or the ROM 115, and executes various types of processing, which will be described later, performed by the image processing apparatus 102.

The RAM 114 includes an area to temporarily store data received from the host computer 101 via the host I/F unit 111. The RAM 114 also includes a work area used by the CPU 113 to execute various types of processing. The ROM 115 stores, for example, programs or data to be executed or used by the CPU 113 to perform overall control of the image processing apparatus 102, and setting data for the image processing apparatus 102.

The storage device control unit 116 performs control to store image data that is to be handled by the image processing apparatus 102, in the storage device 120. The engine I/F unit 117 performs a series of processes for outputting data that has been image processed by the image processing apparatus 102, to the print engine unit 121.

The encoding unit 118 performs encoding processing on the image expanded by the PDL processing unit 112. In the present embodiment, the encoding method may be resolution encoding. The decoding unit 119 decodes encoded data generated by the encoding unit 118 and generates pre-encoding original data. In the present embodiment, the decoding method may be resolution decoding.

The storage device 120 is a mass storage medium (for example, a hard disk) and stores, for example, image data output from the host computer 101 and received by the image processing apparatus 102, and intermediate image data generated during processing. The image processing unit 122 performs image processing on an image constituted by data output from the host computer 101.

The aforementioned units are connected to one another via an internal bus 131 of the image processing apparatus 102. Data transfer between various units is performed through a data transfer unit (not shown), which may be constituted by a DMAC (direct memory access controller) provided between the respective units and the internal bus 131.

Figure 2:
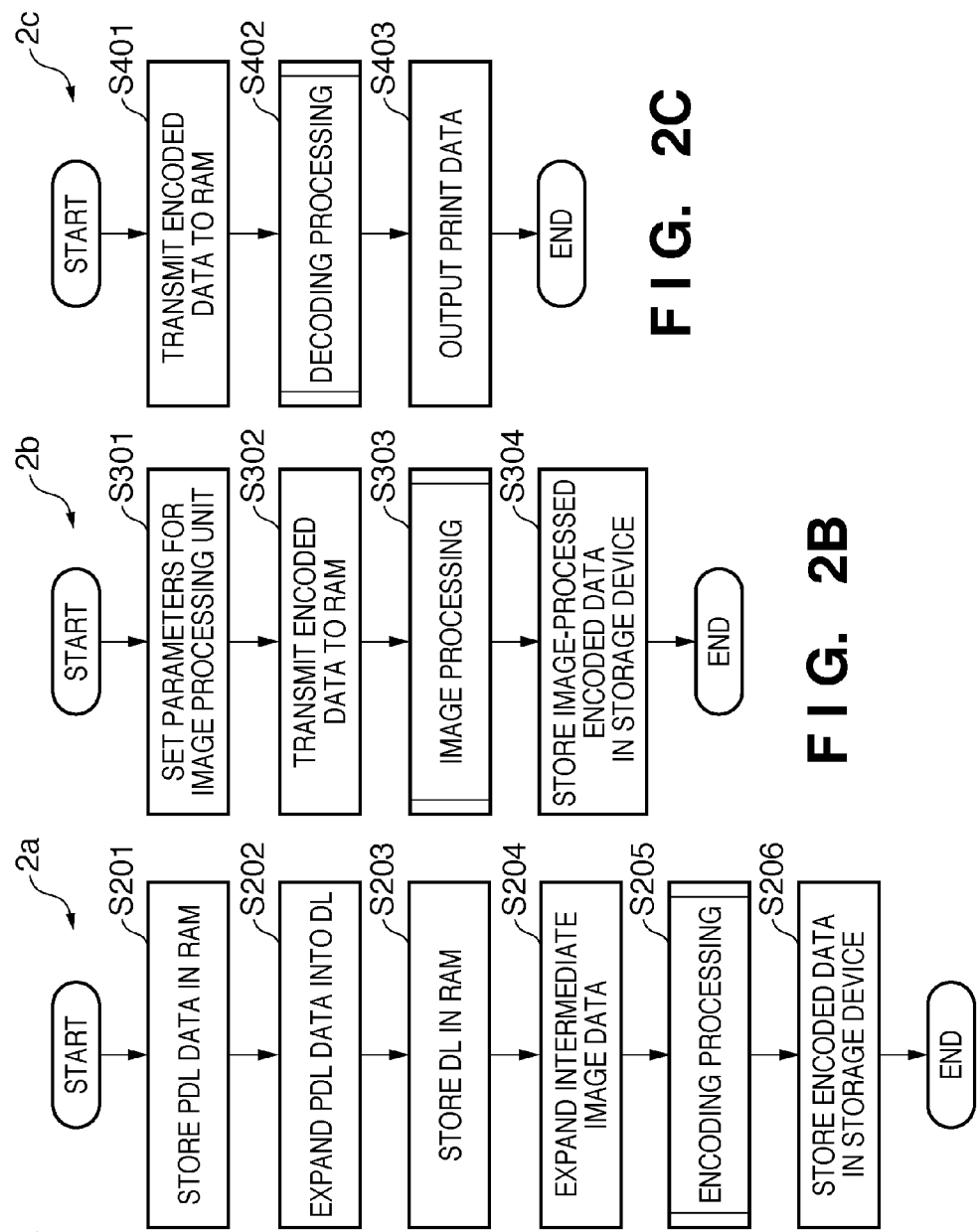
FIGS. 2A to 2C are flowcharts showing the overall processing procedure performed by an image processing apparatus.

Overall Processing Procedure by Image Processing Apparatus (FIGS. 2A-2C)

First, processing performed by the image processing apparatus 102 for encoding and storing print data (PDL data) when receiving the print data from the host computer 101 will be described with reference to the flowchart of FIG. 2A. The processing shown in the flowchart of FIG. 2A is started when the CPU 113 has detected reception of PDL data that is output from the host computer 101 via the host I/F unit 111.

First, the CPU 113 temporarily stores received PDL data in the RAM 114 (S201). Next, the CPU 113 expands the received PDL data in a display list (DL) (S202) and then temporarily stores the DL in the RAM 114 (S203). Specifically, image information included in the PDL data and attribute information corresponding to the image information are generated and stored as the DL. Examples of the attribute information to be generated include characters, lines, and photographs in PDL input.

Then, the PDL processing unit 112 performs image expansion processing based on the stored DL and generates intermediate image data (S204). The image expansion processing is performed on a block-by-block basis, each block having a predetermined size (this unit is hereinafter referred to as a "tile"). The tile size is desirably equal to a region size constituted by multiple 2×2 pixel blocks, which are used in the encoding processing described later. In the present embodiment, the tile size is, for example, a unit of 8×8 pixels. As the intermediate image data, the image information included in the DL and its corresponding attribute information are stored in association with each other on a pixel-by-pixel basis.

The intermediate image data is converted tile by tile into encoded data by the encoding unit 118, the encoded data being constituted by pattern information (arrangement pattern), low-resolution image data (color data of a first color that corresponds to the pixel value of a pixel located at a predetermined position), and interpolation data (color data of second to fourth colors) (S205). Note that the processing performed by the encoding unit 118 will be described in detail later.

The encoded data is output and stored in the storage device 120 via a data transfer unit (not shown) of the storage device control unit 116 (S206). At this time, header information with a predetermined fixed length is added to each tile. Note that the header information will be described in detail later.

Next, processing for reading out encoded data stored in the storage device 120, performing image processing on the encoded data, and re-spooling the image-processed encoded data is described with reference to the flowchart of FIG. 2B. The processing shown in the flowchart of FIG. 2B is started when the CPU 113 has received a notification that the processing for spooling encoded data in the storage device control unit 116 is complete and has given an instruction to start printing to the decoding unit 119.

First, parameter settings for the image processing unit 122 are performed (S301). Specifically, the CPU 113 performs necessary parameter settings for various registers of image processing modules (not shown) included in the image processing unit 122. Then, the CPU 113 instructs the storage device control unit 116 to read out encoded data stored in the storage device 120 to the RAM 114 (S302).

Next, the image processing unit 122 reads out the encoded data from the RAM 114, using an input data transfer unit 901 included therein (see FIG. 6B) that will be described later, and performs predetermined image processing on the encoded data without decoding the encoded data into an original image (S303). Note that the predetermined image processing performed on the encoded data will be described in detail later.

Then, the CPU 113 instructs an output data transfer unit 903 (see FIG. 6B) described later to store the encoded data that has been image-processed in step S303, in the RAM 114 (S304). The CPU 113 further instructs a data transfer unit (not shown) to store the encoded data, which has been stored in the RAM 114, in the storage device 120. The CPU 113 transitions to its idle state after receipt of a notification that all the encoded data transferred from the data transfer unit (not shown) has been stored in the storage device 120.

Next, processing for reading out image-processed encoded data stored in the storage device 120, decoding the encoded data, and outputting the decoded data as print data is described with reference to the flowchart shown in FIG. 2C. The processing shown in the flowchart of FIG. 2C is started when the CPU 113 has received a notification that the processing of step S304 is complete and has given a processing instruction to start printing to the storage device control unit 116.

First, the CPU 113 instructs the storage device control unit 116 to read out encoded data stored in the storage device 120 to the RAM 114 (S401). Next, the decoding unit 119 reads out the encoded data from the RAM 114, using an input data transfer unit 1201 included therein (see FIG. 6C) that will be described later, and performs decoding processing on the encoded data (S402). Note that the decoding processing will be described in detail later.

The decoding unit 119 then outputs decoded image data to the RAM 114, using an output data transfer unit 1203 included therein (see FIG. 6C) that will be described later (S403). Thereafter, the engine I/F unit 117 outputs the image data from the RAM 114 to the print engine unit 121, using a data transfer unit included therein (not shown).

The above-described processes enable data received from the host computer 101 to be encoded and generated as encoded data, which is constituted by the pattern information, the low-resolution image data, and the interpolation data. The processes also enable image processing to be performed on the encoded data without decoding and the image-processed data to be re-spooled in the storage device 120. The image-processed encoded data then can be decoded and output to the print engine unit 121.

Although data is spooled in the storage device 120 via the RAM 114 in the above description, data may be spooled in the RAM 114 without using the storage device 120.

Figure 3:
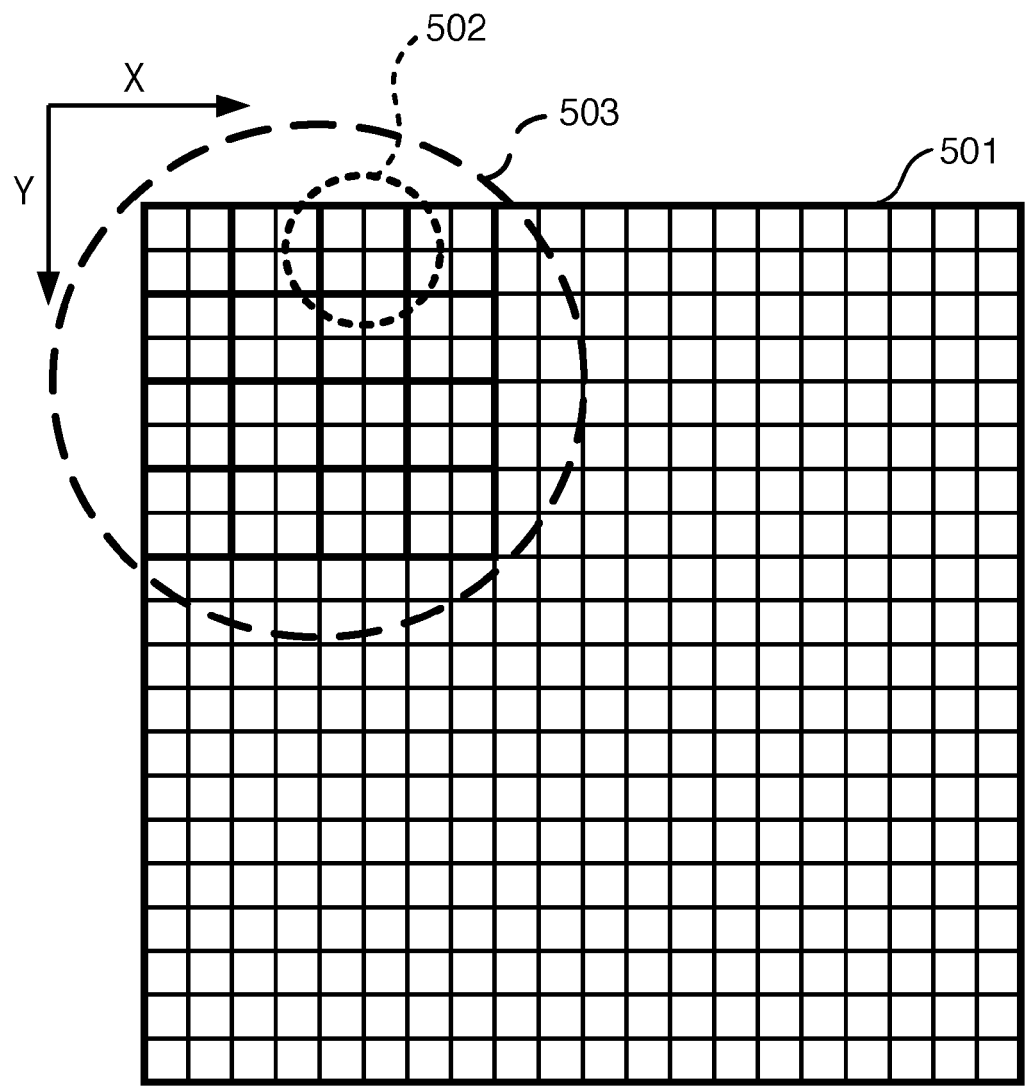
FIG. 3 is a diagram showing the relationship of a page image, a block, and a tile.
Figure 5:
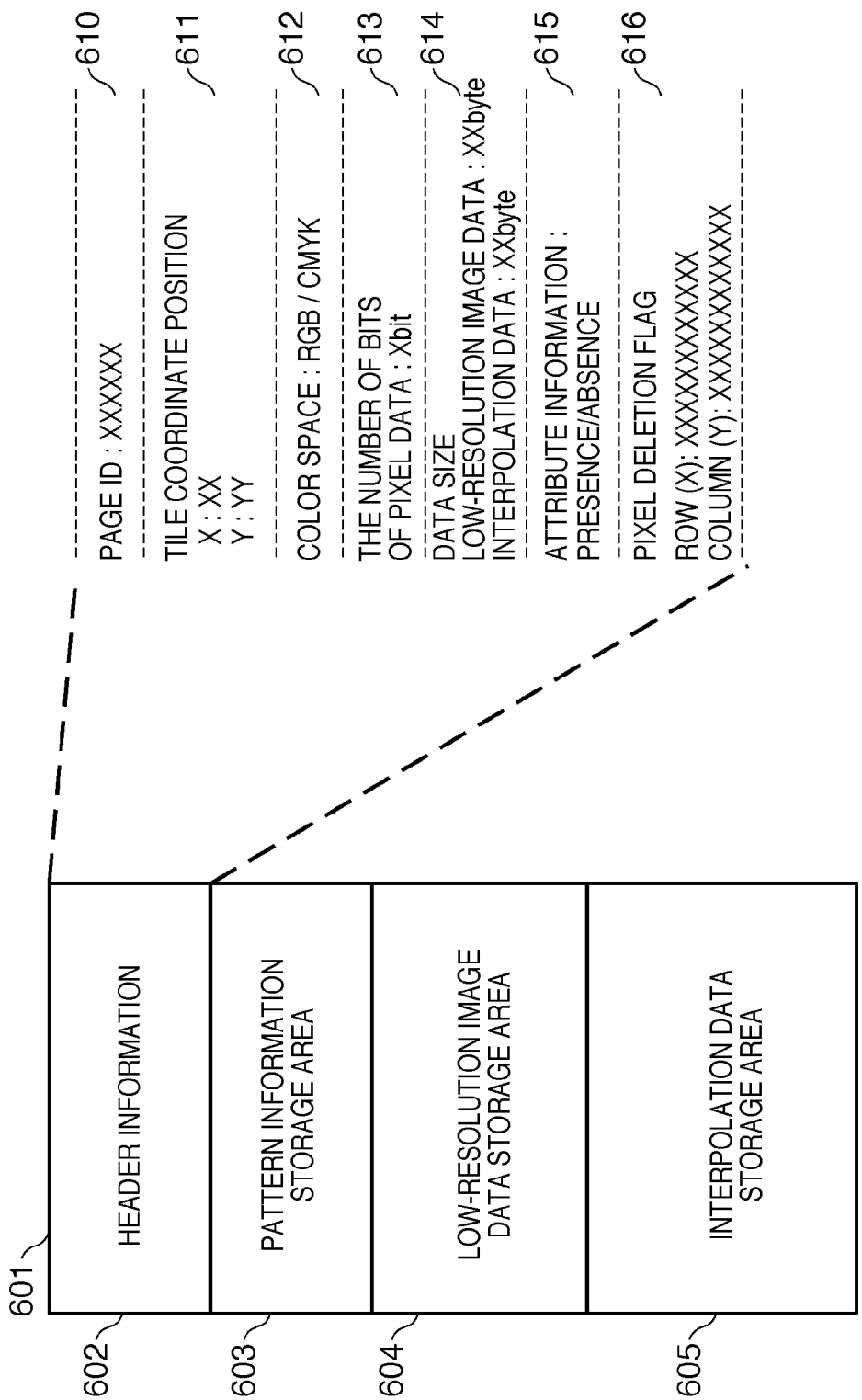
FIG. 5 is a diagram showing the data structure of a tile.

Detailed Configuration of Encoding Unit 118 (FIGS. 3, 4, and 5)

FIG. 3 shows the relationship of a page image 501, which is an input image, a 2×2 pixel block 502 extracted from the page image 501, and an 8×8 pixel tile 503. FIG. 4 shows the relationship of a block, the number of block colors constituting the block, and low-resolution image data and interpolation data that correspond to the block.

First, a description is given of the number of block colors that constitute a block 502. In the case where the number of block colors 505 is one and all of the pixels have the same color, there is only one possible combination of colors. Pattern information corresponding to this combination is 0x0 (where 0x indicates a hexadecimal digit, and the same applies below).

In the case where the number of block colors 505 is two, the number of possible combinations of colors, excluding the case where all of the four pixels have the same color, is seven because, when considering the color (pixel value) of the upper-left pixel as the first color and a color of the other pixels other than the first color as the second color, the remaining three pixels excluding the upper-left pixel are either the first color or the second color. Pattern information corresponding to those seven combinations includes 0x1 to 0x7.

In the case where the number of block colors 505 is three, the number of possible combinations of colors can be rephrased as the number of cases where only one of the three colors is used twice, and accordingly it is sufficient to obtain the number of cases where two of the four pixel coordinates have the same color. In other words, the number of possible combinations of colors in the case of three colors is six, which is the number of combinations in which two of the four coordinates are considered. Pattern information corresponding to those combinations includes 0x8 to 0xD. At this time, the color of the upper-left pixel is defined as the first color, and the other colors are defined as the second and third colors in order each time a new color appears when the pixels are scanned in order of the upper-right pixel, the lower-left pixel, and the lower-right pixel.

In the case where the number of block colors 505 is four, the number of possible combinations of colors is one as in the case where the number of block colors 505 is one. Pattern information corresponding to this combination is 0xE. At this time, the color of the upper-left pixel is defined as the first color, the color of the upper-right pixel as the second color, the color of the lower-left pixel as the third color, and the color of the lower-right pixel as the fourth color.

Consequently, there are a total of 15 possible combinations of colors for the cases where the number of block colors 505 is in the range of one to four.

The tile 503 is a region constituted by multiple 2×2 pixel blocks 502. In the present embodiment, the tile is a region configured by 4×4 blocks (a total of 16 blocks, four in the X direction of the image and four in the Y direction), each block having a size of 2×2 pixels. This is the same size as a block unit used for the aforementioned expansion of the intermediate image data.

Next is a description of the structures of low-resolution image data 506 and interpolation data 507 for the possible number of block colors 505.

The low-resolution image data 506 is color information of a pixel located at a predetermined position (in the present embodiment, the upper-left pixel) in a 2×2 pixel block 502. For example, in the case where the color space is RGB and the data length of each color component of each pixel is 8 bits, information of each color can be represented by a 24-bit length. In the case where the color information of the above upper-left pixel is defined as the first color and the upper-right pixel, the lower-left pixel, and the lower-right pixel are scanned in order specified, the second to fourth colors (interpolation data) are defined in order each time a new color appears during the scanning. Note that although the color of the upper-left pixel is defined as the first color in the present embodiment, the present invention is not limited thereto. Furthermore, the order of pixels to be scanned for determining the second to fourth colors may be defined in advance. For example, the lower-right pixel may be defined as the pixel located at a predetermined position in order to determine the first color, and the remaining pixels at the other positions may be scanned in a predetermined order in order to determine the second to fourth colors, which constitute the interpolation data.

In other words, the interpolation data 507 is data in which, among color information of each pixel other than the upper-left pixel, color information other than the first color (that is, color information pieces of the second to fourth colors) is stored in the order defined for each pattern. In the case where the number of block colors 505 is one, the interpolation data is unnecessary because no colors other than the first color exist in the block, and accordingly the block can be reproduced from the pattern information of 0x0, which indicates that all of the pixels have the same color, and the low-resolution image data, which represents the first color.

Here, the pattern information is 4 bits in length, which is a minimum bit length by which a total of 15 possible combinations of colors can be represented for the possible numbers of block colors 505.

Furthermore, since the color information of each color in the interpolation data is 24 bits in length in the case where the color space is RGB and the data length of each color component of each pixel is 8 bits, the data size of the interpolation data for each block is one of 0, 24, 48, and 72 bits.

Using the pattern information, the low-resolution image data 506, and the interpolation data 507, which have been described above, enables a 2×2 pixel block 502 to be encoded and its data amount to be reduced.

For example, if all of the pixels in a block have the same color, the data amount before encoding is a total of 96 bits, that is, (8 bits for each color of RGB)×(4 pixels). Meanwhile, the data amount after encoding is a total of 28 bits, including 24-bit low-resolution image data, which indicates the color information of the upper-left pixel (first color), and 4-bit pattern information, which indicates that all of the pixels have the same color. This encoded data can be decoded into the original data, that is, a 2×2 pixel block 502, using the pattern information and the color information.

Accordingly, in the case where the number of pixel colors included in a block is one, the color data of a pixel located at a predetermined position (pixel of interest) and the arrangement pattern of colors included in that block are encoded, whereas in the case where the number of pixel colors included in a block is two or more, the color data of pixels other than a pixel located at a predetermined position (pixel of interest), which corresponds to the number of colors, is also encoded in addition to the color data of the pixel of interest and the arrangement pattern of colors included in that block. The pattern information, the low-resolution image data (color information of the first color), and the interpolation data (color information of the second to fourth colors), obtained for each block, are stored in different memory regions (for example, a pattern information storage area, a low-resolution image data storage area, and an interpolation data storage area) in order of arrangement of the blocks included in each tile.

Next is a description of the data structure of an encoded tile 503 with reference to FIG. 5. A data structure 601 of the tile 503 includes header information 602, a pattern information storage area 603, a low-resolution image data storage area 604, and an interpolation data storage area 605.

The header information 602 is constituted by management information of the tile 503 with respect to the page image 501. In the present embodiment, the header information 602 includes, for example, a page ID 610, tile coordinates 611, a color space 612, the number of bits in image data 613, data sizes 614 of the low-resolution image data storage area and the interpolation data storage area, the presence or absence of attribute information 615, and a pixel deletion flag 616 (deletion information).

The page ID 610 indicates an identification number of the tile that is unique to each page. The tile coordinates 611 indicate the position of the tile in a raster image for each page. In the present embodiment, the tile coordinates are defined in two dimensions by X and Y coordinates. The color space 612 indicates an identifier that designates the color space (such as RGB or CMYK) of an image constituting the tile. The number of bits 613 in image data indicates the bit length (color depth) per pixel in the tile. The data size 614 indicates the data sizes of the low-resolution image data and the interpolation data of the pixels constituting the tile. The presence or absence of attribute information 615 indicates whether or not each pixel of the tile has attribute information.

The pixel deletion flag 616 is a feature of the image processing according to the present invention, and is used to designate a pixel deletion position in order to delete pixels in units of a row or column. The pixel deletion flag 616 designates rows (X direction) and columns (Y direction) independently, and is constituted by the data lengths corresponding to the numbers of pixels of the tile in both the X and Y directions. In the present embodiment, the tile size is 8×8 pixels, so both the row and column lengths of the pixel deletion flag are 8 bits.

Figure 6A:
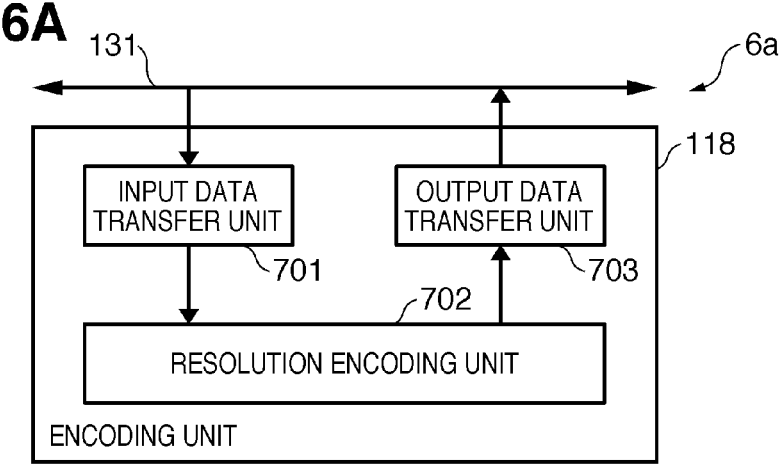
FIGS. 6A to 6C are diagrams respectively showing the configurations of an encoding unit, an image processing unit, and a decoding unit.
Figure 7:
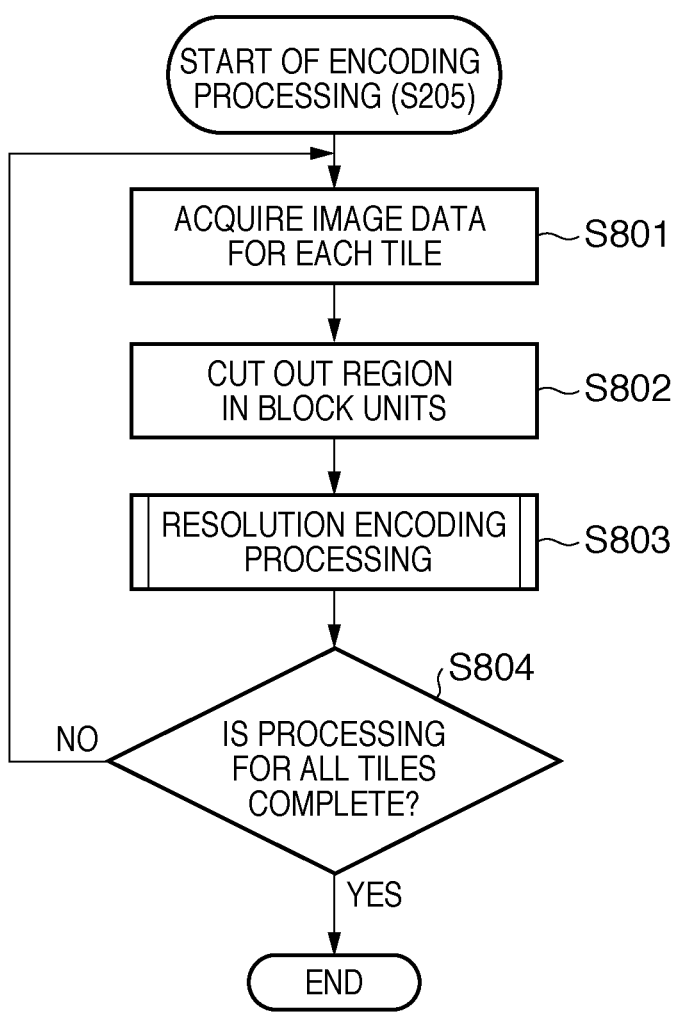
FIG. 7 is a flowchart showing the detailed processing procedure of encoding processing (S205).
Figure 8:
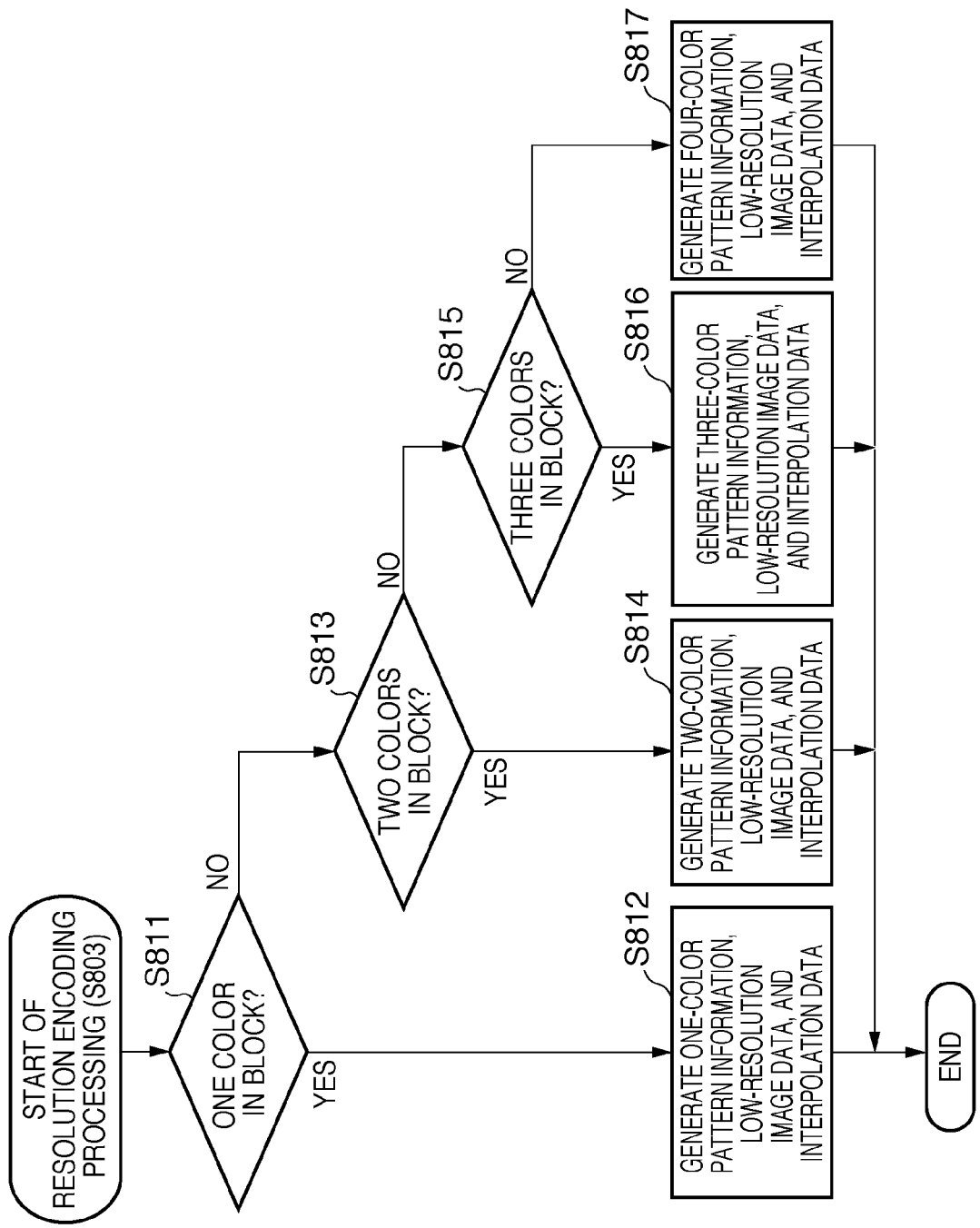
FIG. 8 is a flowchart showing the detailed processing procedure of resolution encoding processing (S803).
Figure 9:
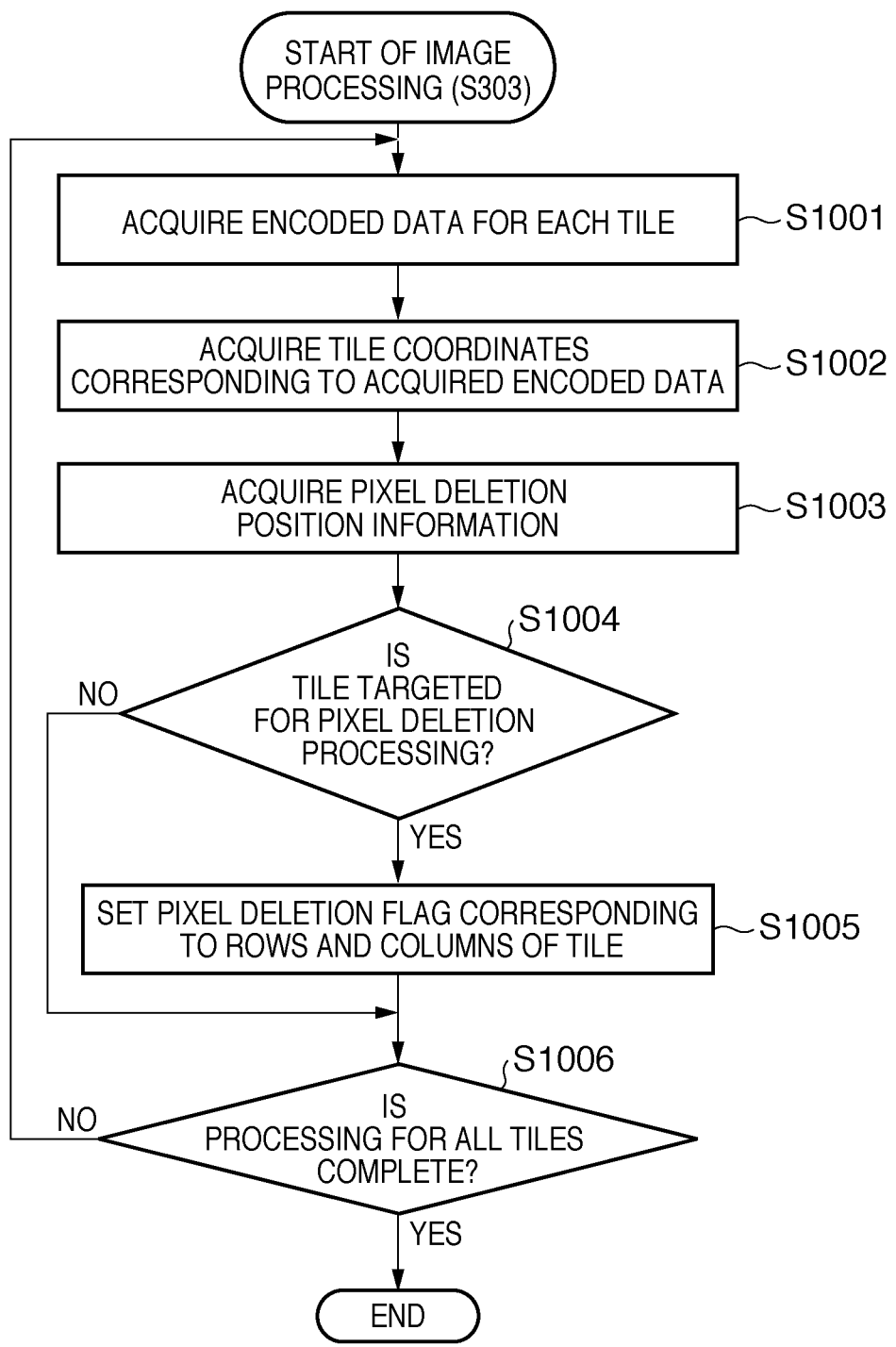
FIG. 9 is a flowchart showing the detailed processing procedure of pixel deletion processing (S303).

Detailed Procedure of Encoding Processing (S205) (FIGS. 6A, 7, and 8)

First, an input data transfer unit 701 shown in FIG. 6A, which is connected to the internal bus 131, acquires data targeted for processing, which has been stored in advance in the RAM 114 or the storage device 120 (S801). In the present embodiment, the data targeted for processing is intermediate image data that is generated in a tile format by the PDL processing unit 112. Specifically, image data extracted for each tile is acquired. Register settings (not shown), such as a data transfer start address and a data length, that are necessary for the input data transfer unit 701 to perform operations are carried out in advance by the CPU 113. Then, 2×2 pixel blocks are cut out of the tile (S802) and sequentially output to a resolution encoding unit 702 shown in FIG. 6A. Upon receiving an input of a 2×2 pixel block from the input data transfer unit 701, the resolution encoding unit 702 performs resolution encoding processing on the block (S803). More specifically, as illustrated in FIG. 8, the resolution encoding unit 702 compares the color (pixel value) of each pixel included in the input block, so as to specify the pattern information indicating the arrangement pattern of colors included in the block and determine how many colors (one, two three, or four colors) are included in the block (S811, S813, and S815). According to the determination result, the resolution encoding unit 702 extracts the color information of the first color from the pixel value of a pixel located at a predetermined position in the block, and in the case where it has been determined that the colors included in the block are in the range of two to four, further extracts, from the block, the color information of the second to fourth colors which corresponds to the arrangement pattern defined by the specified pattern information. The resolution encoding unit 702 then stores the pattern information, the color information of the first color (low-resolution image data), and the color information of the second to fourth colors (interpolation data) for each block in the respective memory regions in order, so as to generate the encoded data of the tile (S812, S814, S816, and S817). Note that in the case where a block includes only one color, the interpolation data is zero because the block does not include the second to fourth colors. In step S803, the processing of steps S811 to S817 is performed on each block included in the tile.

An output data transfer unit 703 shown in FIG. 6A, which is connected to the internal bus 131, outputs encoded data generated by the resolution encoding unit 702 to the RAM 114, which is connected to the internal bus 131. Register settings (not shown), such as an image write address in the RAM 114 and an output data length, that are necessary for the output data transfer unit 703 to perform operations are carried out in advance by the CPU 113.

The above-described processes are repeatedly performed on all of the tiles, and after the processing for all of the tiles has ended, the encoding processing ends (S804).

Detailed Procedure of Image Processing (S303) (FIGS. 6B, 9, 10, and 11)

Here, the image processing unit 122 performs image processing, specifically pixel deletion processing, in units of a row or column in the present embodiment. By adding a flag, which indicates pixels to be deleted, to the header information of each tile, image deletion processing can be performed virtually on encoded data, which has been input on a tile-by-tile basis, without decoding.

Figure 6B:
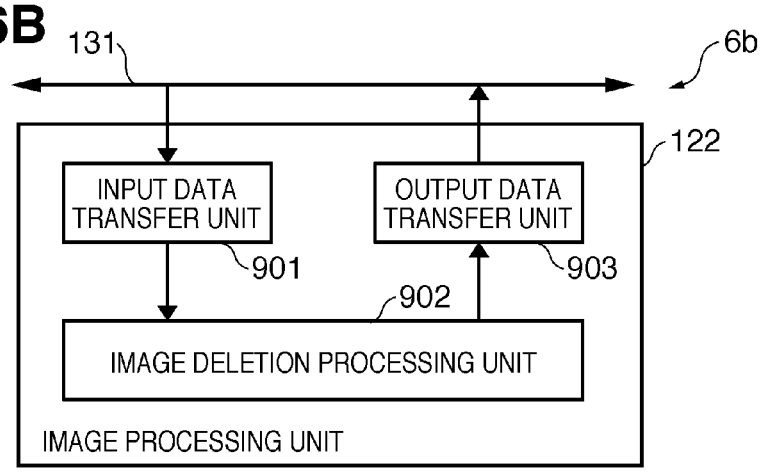

First, the input data transfer unit 901 shown in FIG. 6B, which is connected to the internal bus 131, acquires data targeted for processing, which has been stored in advance in the RAM 114 or the storage device 120 (S1001). In the present embodiment, the data targeted for processing is encoded data that has been encoded tile by tile by the encoding unit 118 and is constituted by the low-resolution image data and the interpolation data. Register settings (not shown), such as a data transfer start address and a data length, that are necessary for the input data transfer unit 901 to perform operations are carried out in advance by the CPU 113. The acquired encoded data of each tile is output to a pixel deletion processing unit 902 shown in FIG. 6B.

The pixel deletion processing unit 902 acquires the coordinates of the tile (S1002). The coordinates are acquired by referencing the tile coordinates 611 in the header information of the tile. Next, pixel deletion position information for the page image is acquired (S1003). The pixel deletion position information is information that designates rows or columns to be deleted in the page image in units of single rows or columns. It is assumed that the pixel deletion position information has been set by the CPU 113 in a register (not shown) of the image processing unit 122 in accordance with pre-designated settings.

In accordance with the pixel deletion position information of the page image acquired in step S1003, the pixel deletion processing unit 902 determines whether or not the tile corresponding to the acquired encoded data includes a row or column to be deleted (S1004). Specifically, the pixel deletion processing unit 902 calculates the position of the tile in the page image from the tile coordinates acquired in step S1002, compares the coordinates of the calculated position with the pixel deletion position information of the page image acquired in step S1003, and determines whether or not the tile includes a pixel deletion position. If the tile includes a pixel deletion position, the pixel deletion processing unit 902 determines that the tile is targeted for pixel deletion processing, and performs the settings of the pixel deletion flag, which corresponds to the pixel rows and columns of the tile, in accordance with the pixel deletion position information (S1005). In other words, a value of the pixel deletion flag that corresponds to a pixel row or column to be deleted is set to ON (1). On the other hand, if the tile does not include a pixel deletion position, the settings for pixel deletion processing are not performed for that tile. In other words, in the case where the tile includes no pixel deletion position, all of the values of the pixel deletion flag remain OFF (0).

Figure 10:
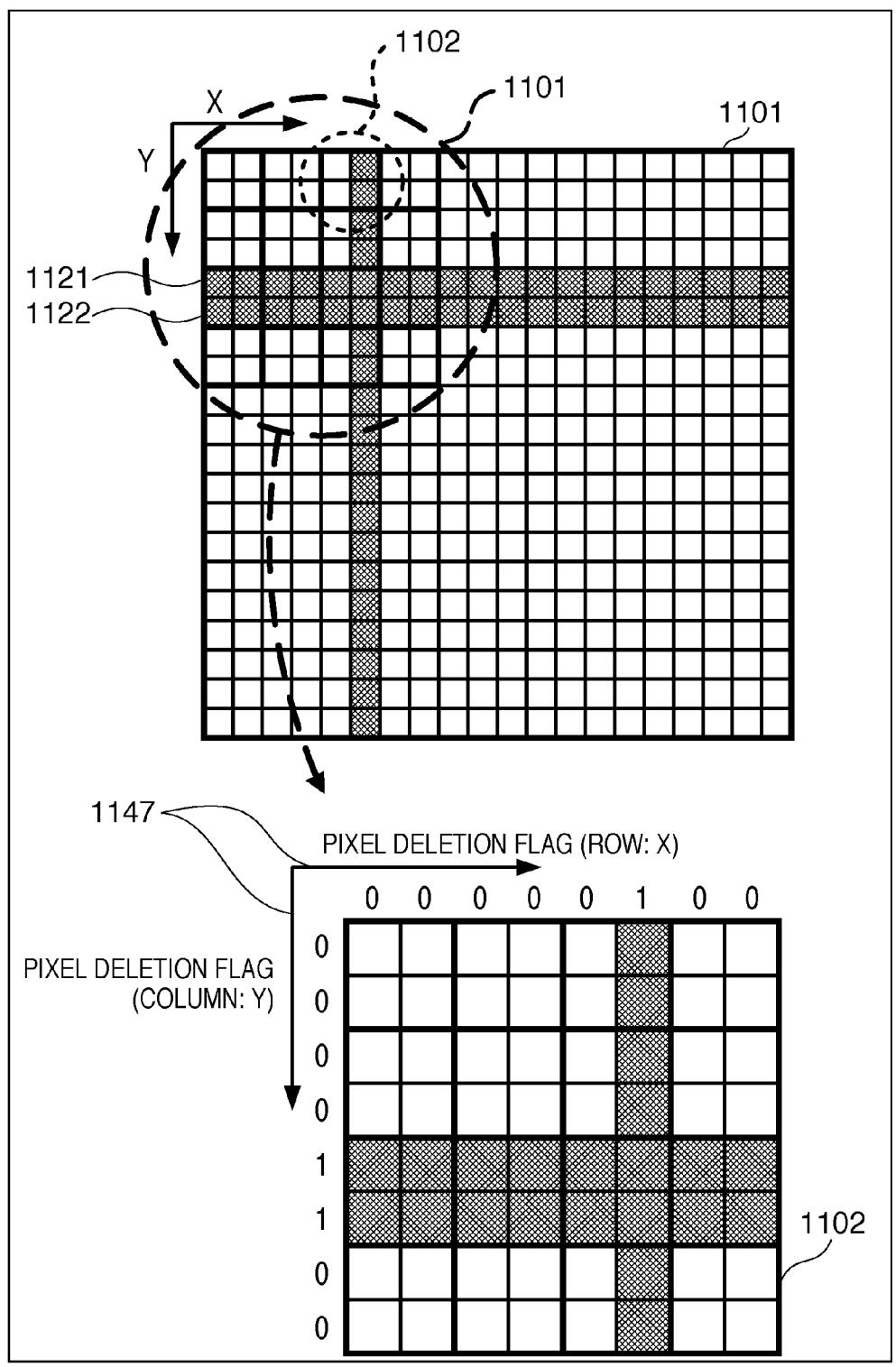
FIG. 10 is a diagram schematically showing the pixel deletion processing.

A concrete example of the settings of the pixel deletion flag is described with reference to FIGS. 10 and 11. Consider a case in which pixel deletion processing is performed on a tile 1102 included in a page image 1101. The sixth row 1110 of the X coordinate of the page image and the fifth and sixth columns 1121 and 1122 of the Y coordinate of the page image are set in the pixel deletion position information of the page image. According to this pixel deletion position information, the sixth row of the X coordinate and the fifth and sixth columns of the Y coordinate are also pixel deletion positions in the tile 1102. Accordingly, in a data structure 1131 of the tile 1102, a pixel deletion flag 1147 in header information 1132 is 00000100 for rows X and 00001100 for columns Y. Even if the tile 1102 has been encoded, which pixels are to be deleted can be determined by referencing the pixel deletion flag 1147.

The output data transfer unit 903 shown in FIG. 6B, which is connected to the internal bus 131, outputs image data of each tile that has been processed by the image processing unit 122, to the RAM 114, which is connected to the internal bus 131. Register settings (not shown), such as an image write address on the RAM 114 and an output data length, that are necessary for the output data transfer unit 903 to perform operations are carried out in advance by the CPU 113.

The above-described processes are repeatedly performed on all of the tiles, and after the processing for all of the tiles has ended, the pixel deletion processing ends (S1006).

Figure 6C:
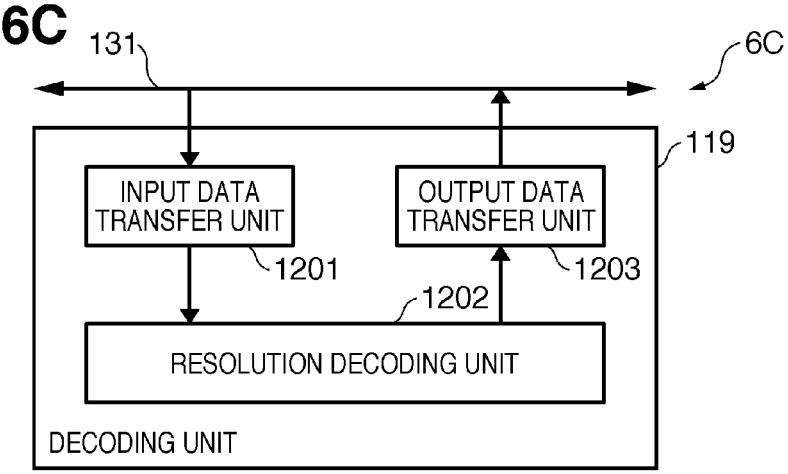
Figure 12A:
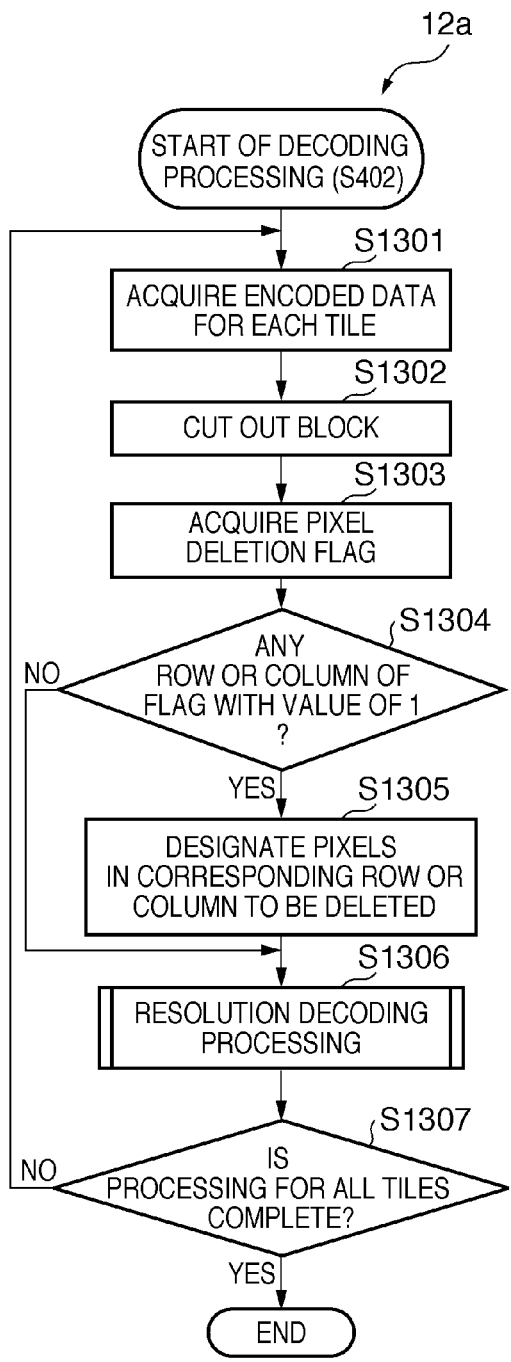
FIGS. 12A and 12B are flowcharts showing respectively the detailed processing procedures of decoding processing (S402) and resolution decoding processing (S1306).

Detailed Procedure of Decoding Processing (S402) (FIGS. 6C and 12A)

First, the input data transfer unit 1201 (FIG. 6C) connected to the internal bus 131 acquires data targeted for processing, which has been stored in advance in the RAM 114 or the storage device 120 (S1301). In the present embodiment, the data targeted for processing is encoded data that has been encoded tile by tile by the encoding unit 118 and out of which a pixel row or column to be deleted has been designated by the image processing unit 122. Register settings (not shown), such as a data transfer start address and a data length, that are necessary for the input data transfer unit 1201 to perform operations are carried out in advance by the CPU 113. Then, a 2×2 pixel block is cut out of the tile (S1302) and output to a resolution decoding unit 1202 (FIG. 6C).

The resolution decoding unit 1202 acquires the pixel deletion flag in the header information of the input tile (S1303), and determines whether or not to delete a pixel row or column from the input tile (S1304). In other words, the resolution decoding unit 1202 determines whether or not the values of the pixel deletion flag, which correspond to rows and columns, include an effective bit (1). If the pixel deletion flag includes an effective bit (1), the resolution decoding unit 1202 designates the pixel row or column designated by the pixel deletion flag to be deleted (S1305). In other words, the resolution decoding unit 1202 associates the pixel deletion flag with the block and designates a pixel deletion position for each block. If the pixel deletion flag includes no effective bits (1), the resolution decoding unit 1202 does not designate a pixel deletion position to be deleted. The resolution decoding unit 1202 then performs resolution decoding processing (S1306).

Figure 12B:
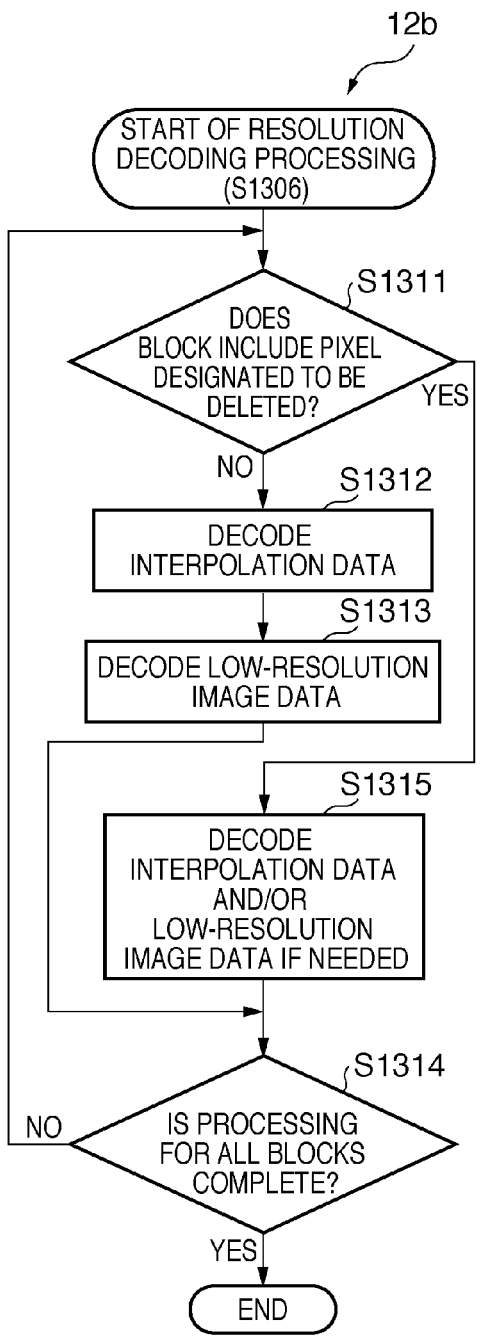

In step S1306, as illustrated in FIG. 12B, the resolution decoding unit 1202 first determines whether or not each 2×2 pixel block to be decoded includes a pixel row or column that has been designated to be deleted, based on the deletion designation performed in step S1305 (S1311). If the entire 2×2 pixel block has been designated to be deleted, decoding processing is not performed on that block.

If the block includes no pixel row or column that has been designated to be deleted, the resolution decoding unit 1202 references the pattern information, reads out the interpolation data (color information of the second to fourth colors) of the block from an interpolation data storage area 1135 and decodes the interpolation data (S1312), and reads out the low-resolution image data (color information of the first color) of the block from a low-resolution image data storage area 1134 and decodes the low-resolution image data (S1313).

If the block includes part of a pixel row or column that has been designated to be deleted, decoding processing is performed on pixels included in a pixel row or column that has not been designated to be deleted (S1315). At this time, in accordance with the pattern information of the block targeted for processing and the pixel row or column that has been designated to be deleted, it is determined whether or not the interpolation data and the low-resolution image data of the block need to be read. For example, in the case where the pattern information of a block is "0x4" as shown in FIG. 4, the color information of the first color is used for only the upper-left pixel. Thus, if the upper-left pixel is included in a pixel row or column to be deleted, the resolution decoding unit 1202 determines that the low-resolution image data (the color information of the first color) of that block does not need to be read out from the low-resolution image data storage area 1134 and accordingly reads and decodes only the interpolation data of the block in step S1312, while skipping the processing of step S1313. Furthermore, in the case where the pattern information of a block is "0x3" and the upper-right and lower-right pixels are targeted for deletion, the color information of the second color is unnecessary. Thus, the resolution decoding unit 1202 determines that the interpolation data does not need to be read out and accordingly reads the low-resolution image data of the block in step S1313 and decodes the upper-left pixel and the lower-left pixel, while skipping the processing of step S1312.

After the decoding of the pixels in all of the blocks included in the tile has ended, the resolution decoding processing ends (S1314).

The above-described processes are repeatedly performed on all of the tiles included in the input image, and after the processing for all of the tiles has ended, the decoding processing ends (S1307). The decoded image data is output via the output data transfer unit 1203 shown in FIG. 6C to the RAM 114, which is connected to the internal bus 131. Register settings (not shown), such as an image write address on the RAM 114 and an output data length, that are necessary for the output data transfer unit 1203 to perform operations are carried out in advance by the CPU 113.

As described above, according to the present embodiment, a pixel row or column to be deleted can be designated without decoding encoded image data. Furthermore, it is possible, at the time of decoding, to decode only a block that does not include a pixel row or column that has been designated to be deleted, without decoding a block that includes a pixel row or column that has been designated to be deleted.

The present invention can be applied to printers or multifunctional peripherals that perform image processing functions such as image combination processing, including the 2-in-1 printing function and repeated image printing function.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2010-122029, filed May 27, 2010, which is hereby incorporated by reference herein in its entirety.

The invention claimed is:

1. An image processing apparatus comprising:
    an encoding unit constructed to encode image data on a tile-by-tile basis to obtain encoded image data, each tile being constituted by a plurality of blocks, and each block having a predetermined size; and
    an image processing unit constructed to perform an image processing for deleting a pixel row or column of the encoded image data without decoding the encoded image data, by determining whether or not each tile of the encoded image data includes the pixel row or column designated to be deleted and storing deletion information that indicates a corresponding pixel row or column designated to be deleted in the tile, in header information of the tile for which it is determined that the tile includes a pixel row or column designated to be deleted.

2. The image processing apparatus according to claim 1, further comprising:
    a decoding unit constructed to sequentially decode each block included in an encoded tile of the encoded image as a processing target block,
    wherein in the case where the deletion information indicates that all pixels in the processing target block have been designated to be deleted, the decoding unit does not decode the processing target block,
    and wherein in the case where the deletion information indicates that some of pixel rows or columns of the processing target block have been designated to be deleted, the decoding unit decodes a pixel that has not been designated to be deleted, and does not decode a pixel that has been designated to be deleted.

3. The image processing apparatus according to claim 1, wherein
    the block has a size of 2×2 pixels, and
    the encoding unit is further constructed to perform:
    specifying pattern information by sequentially targeting each block included in a tile for processing and comparing a pixel value of each pixel included in each of the targeted blocks, the pattern information indicating an arrangement pattern of pixel values included in each of the targeted blocks;
    extracting color information of a first color from the pixel value of a pixel located at a predetermined position in each block, and if it has been determined that the number of colors included in the block is in the range of two to four, further extracting, from the block, color information of a second color, second and third colors, or second to fourth colors, which depends on the arrangement pattern defined in the specified pattern information; and
    generating encoded data of the tile by storing the specified pattern information of each block, the extracted color information of the first color, and the extracted color information of the second to fourth colors in a memory.

4. An image processing method using a computer and comprising:
    an encoding step of encoding image data on a tile-by-tile basis to obtain encoded image data, each tile being constituted by a plurality of blocks, and each block having a predetermined size; and
    an image processing step to perform an image processing for deleting a pixel row or column of the encoded image data without decoding the encoded image data, by determining whether or not each tile of the encoded image data includes the pixel row or column designated to be deleted and storing deletion information that indicates a corresponding pixel row or column designated to be deleted in the tile, in header information of the tile for which it is determined that the tile includes a pixel row or column designated to be deleted.

5. A program for causing a computer to function as:

an encoding unit constructed to encode image data on a tile-by-tile basis to obtain encoded image data, each tile being constituted by a plurality of blocks, and each block having a predetermined size; and an image processing unit constructed to perform an image processing for deleting a pixel row or column of the encoded image data without decoding the encoded image data, by determining whether or not each tile of the encoded image data includes the pixel row or column designated to be deleted and storing deletion information that indicates a corresponding pixel row or column designated to be deleted in the tile, in header information of the tile for which it is determined that the tile includes a pixel row or column designated to be deleted.

* * * * *